United States Patent [19]
Coto

[11] Patent Number: 5,653,132
[45] Date of Patent: Aug. 5, 1997

[54] STEERING WHEEL LOCKING APPARATUS

[76] Inventor: William Coto, 303 Autumn Ave., Brooklyn, N.Y. 11204

[21] Appl. No.: 585,283

[22] Filed: Jan. 11, 1996

[51] Int. Cl.⁶ .................................................. B60R 25/02
[52] U.S. Cl. ........................... 70/209; 70/226; 70/237
[58] Field of Search ............................ 70/209–212, 225, 70/226, 237, 238; 74/552

[56] References Cited

U.S. PATENT DOCUMENTS

| D. 350,472 | 9/1994 | White | D8/331 |
| 4,103,524 | 8/1978 | Mitchell | 70/209 |
| 5,031,429 | 7/1991 | Wang | 70/209 |
| 5,055,823 | 10/1991 | Fuller | 340/426 |
| 5,216,908 | 6/1993 | Malvey | 70/218 |
| 5,267,458 | 12/1993 | Heh | 70/209 X |
| 5,275,030 | 1/1994 | Cole | 70/209 |
| 5,363,679 | 11/1994 | Prasad | 70/209 |
| 5,381,679 | 1/1995 | Cummins | 70/209 |

FOREIGN PATENT DOCUMENTS

| 9204211 | 3/1992 | WIPO | 70/226 |

*Primary Examiner*—Suzanne Dino
*Attorney, Agent, or Firm*—Robert W. J. Usher

[57] ABSTRACT

A rigid security bar is telescopically mounted in a tubular spoke of a steering wheel for movement between retracted and extended positions concealed within the spoke and protruding radially beyond the wheel rim to prevent effective wheel movement by obstruction with a vehicle windshield. A locking mechanism secures the security bar in either position and a biassing spring is mounted in the spoke in engagement with an inner end of the security bar pushing the security bar to be extended for a short distance exposing an end for pulling out by the driver to the fully extended position. A plurality of tubular spokes with associated security bars can extend chordal fashion between opposite sides of the rim. An anchoring chain can be attached to an inner end of the security bar extending around an air bag housing mounted centrally of the wheel.

3 Claims, 4 Drawing Sheets

STEERING WHEEL LOCKING APPARATUS

FIELD OF THE INVENTION

The invention relates to steering wheel locking apparatus for preventing theft of an automobile by obstructing rotational movement of the steering wheel.

BACKGROUND OF THE INVENTION

A variety of mechanical steering wheel locking apparatus have been proposed, commonly clamping the steering wheel to a brake pedal or to one or more obstructive security arms which prevent effective rotation thereof by engagement with an adjacent body part of the automobile such as the windscreen. As these devices are visible from the exterior of the vehicle when in use they act also as a deterrent to intending thieves.

Examples of such prior apparatus are described in U.S. Pat. No. 5,275,030 issued Jan. 4, 1994 to Cole; U.S. Pat. No. 5,363,679 issued Nov. 15, 1994 to Prasad; Jan., 4, 1994 to Cole; U.S. Pat. No. Des. 3,504,72 issued Sep. 13, 1994 to White; U.S. Pat. No. 4,103,524 issued Aug. 1, 1978 to Mitchell et al., and U.S. Pat. No. 5,055,823 issued Oct. 8, 1991 to Fuller.

However all such apparatus require separate storage and require the user, typically the driver to assemble the apparatus to the steering wheel after parking and to disassemble the apparatus before driving.

Such assembly and disassembly steps are awkward and time consuming often involving additional size matching adjustments while the disassembled apparatus must be stored in a convenient location for immediate access by the driver with risk of obstructing the pedals or other controls, usually forming an inconvenient obstacle on the front passengers side of the vehicle.

A different approach is taught by U.S. Pat. No. 5,216,908 issued Jun. 8, 1993 to Cole but this is a relatively complex and expensive mechanism which disconnects the entire steering wheel from the steering column to prevent use of the steering wheel.

SUMMARY OF THE INVENTION

The invention was conceived to avoid or ameliorate at least some of the above-mentioned disadvantages.

The invention provides a steering wheel having a built-in rotation obstructing bar readily movable by the driver between retracted, inoperative and extended, rotation preventing positions.

More specifically, according to one aspect of the invention there is provided a combination steering wheel and anti-theft apparatus comprising: a steering wheel having a tubular spoke with an opening at a radially outer end and a wheel rim formed with a through hole communicating with the opening; an elongate, rigid security bar telescopically mounted in the spoke for movement along the spoke between an inoperative, retracted position within the rim, and an operative, fully extended position in which an obstructing outer end portion of the bar protrudes radially beyond the rim by a obstructive distance sufficient to prevent effective rotation of the wheel in an automobile, respectively; and, locking means on the wheel and security bar engageable to retain the security bar in the retracted and fully extended positions, alternatively.

Thus, the security bar can simply be extended and withdrawn, radially, between operative and inoperative positions by the driver when parking or immediately prior to driving without changing position, without any assembly or disassembly steps being required and without causing obstructive inconvenience when not in use.

The mounting of the security bar within a tubular spoke can provide an extremely strong structure with limited access for the destructive tools of a thief.

As the modifications to a conventional wheel are relatively small with few additional parts being required the apparatus also provides a cost effective solution which can be either installed as an option by the original vehicle manufacturer or retrofitted as a replacement steering wheel.

Preferably, a resilient biasing spring is provided within the spoke in engagement with an anchoring end of the security bar for extending the obstructing end portion of the security bar beyond the rim by a predetermined amount less than the obstructive distance so as to permit the obstructing end portion to be grasped by the driver and then simply pulled out to the obstructive distance.

The length of the security bar can be substantially greater than a radius of the wheel ensuring particularly effective obstruction. When the center of the wheel is obstructed by a horn mechanism or an air bag the length of the security bar may be accommodated by one or more eccentric spokes which extend chordal fashion. When a plurality of such tubular spokes are provided, their associated security arms are extensible in opposite radial directions to provide increased obstruction.

In an alternative arrangement in which the wheel has a central housing for an air bag, a passageway extends from a radially inner end of the spoke and is curved partly around a radially outer periphery of the central housing forming a blind ended socket. An elongate chain link anchoring member is secured to an inner end of the security bar and received as a sliding fit in the socket so as to be confined to move laterally only in conformity with a curvature of the socket and, a resiliently compressible biassing spring is mounted in the socket between a blind end thereof and a free end of the anchoring member to bias the obstructing end portion of the security bar toward an extended position. The chain link can be similar to that used in a chain wrench of four link width providing an extremely simple and strong locking structure in combination with a latch member on the wheel engageable between selected links of the anchoring member.

The obstructing end portion of the bar may have a tip profiled (eg cast, machined or capped) to match the periphery of the rim so as to lie flush or contiguous therewith when retracted so as to form a smooth continuation of the rim in an unobtrusive, aesthetically acceptable fashion.

In a convenient and extremely strong version the locking means comprises a plurality of annular locking recesses provided on an anchoring end portion of the locking bar opposite the obstructing end portion and a latch member on the wheel engageable in selected of said recesses and operated by one of a key mechanism and a security code mechanism.

BRIEF DESCRIPTION OF THE DRAWINGS

Specific embodiments of the invention will now be described by way of example only and with reference to the accompanying drawings in which.

DESCRIPTION OF PREFERRED EMBODIMENTS

Figure 1:
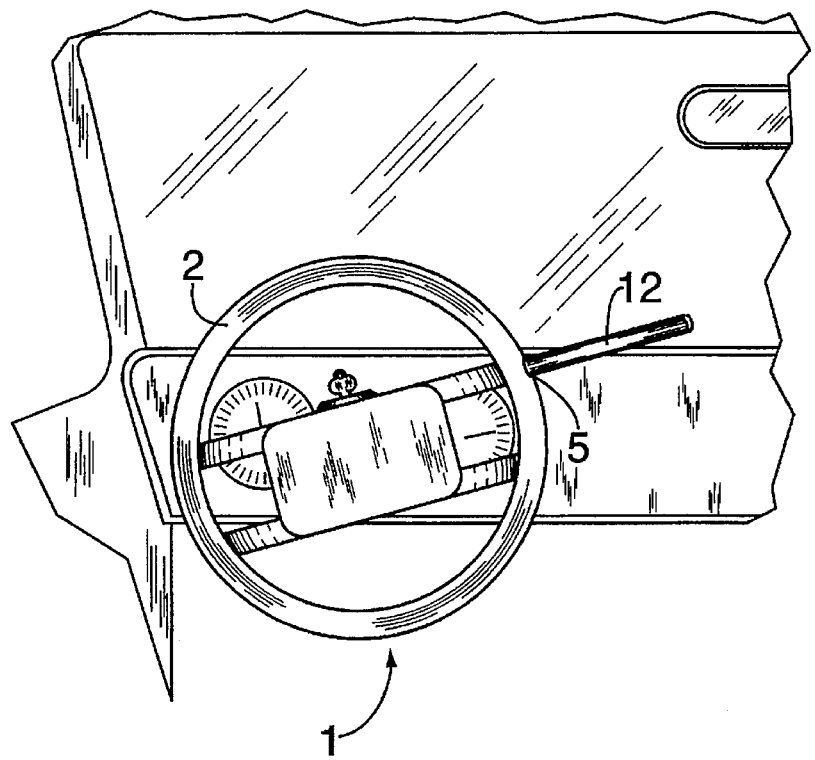
FIG. 1 is a perspective view of a first embodiment of the invention installed in an automobile with the security bar in an extended position.

As shown in FIGS. 1–7, a combination steering wheel and anti-theft apparatus 1 comprises a steering wheel 2 having a tubular spoke 3 which extends in slightly eccentric, chordal fashion to join opposite portions of a rim 4. The tubular spoke 3 communicates at respective opposite ends with a through-hole 5 formed in one of the rim portions and a blind socket 6 formed in the opposite rim portion. The tubular spoke 3 is integral with one side of a rectanguloid horn housing assembly 7 at a hub and supported at an opposite side by a second, shorter spoke 9.

Figure 6:
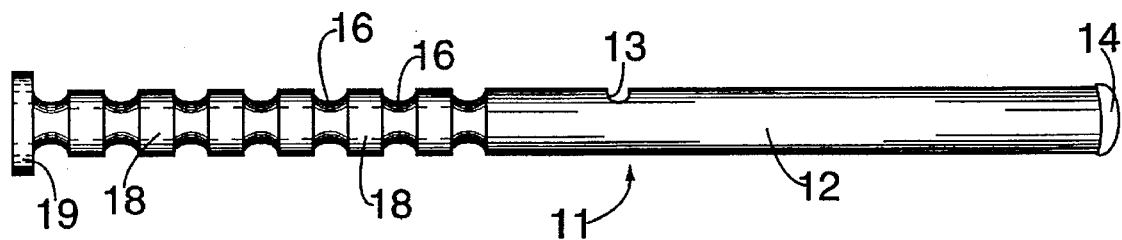
FIG. 6 is a perspective view of the security bar.

As best seen in FIG. 6, an elongate, rigid security bar 11 comprises a solid, cylindrical steel rod formed in one piece with obstructing portion 12 integrally connected to an anchoring portion 13. The obstructing portion 11 has a free end formed with a tip 14 having a profile conforming to the outer profile of the wheel rim and a locking recess 13. The anchoring portion 12 is formed with a series of annular anchoring or locking recesses 16 defining ribs 18 therebetween and has a free end formed with an annular radially enlarged stop flange 19. The lengths of the obstructing and anchoring portions are approximately 7 inches and 6.5 inches, respectively, giving a total security rod length of approximately 13.5 inches while the outer diameter of the rim of the steering wheel is approximately 14 inches. The diameter of the steel rod is ¾ inch.

Figure 5:
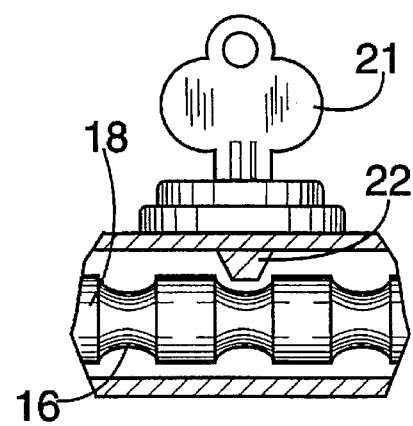
FIG. 5 is an enlarged diagrammatic fragmentary view, partly cut away of the locking mechanism.
Figure 2:
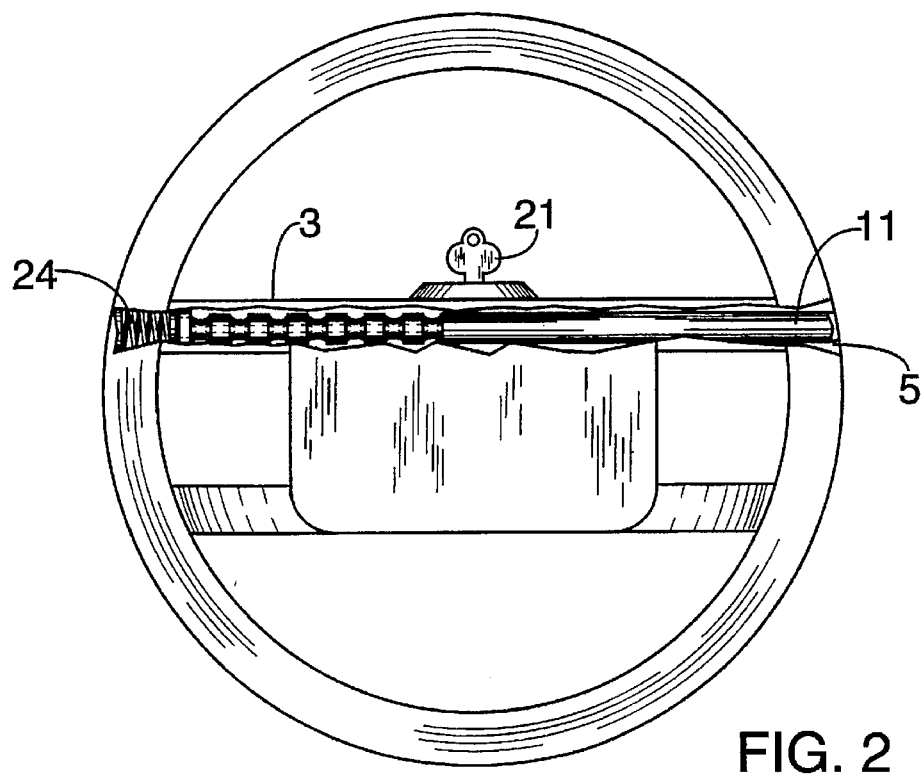
FIG. 2 is a diagrammatic plan view of the a first embodiment partly in cross section with the security bar in an extended position.
Figure 3:
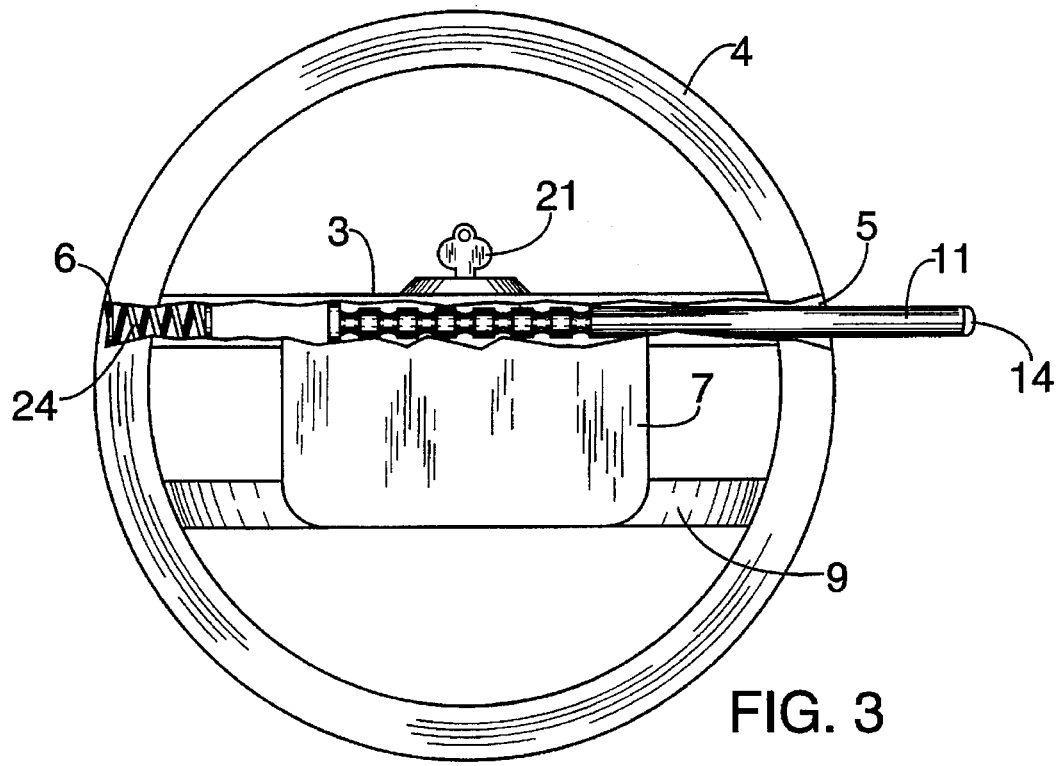
FIG. 3 is a diagrammatic plan view of the a first embodiment partly in cross section with the security bar in a retracted position.

The security rod is telescopically mounted in the tubular spoke 3 for movement therealong between an inoperative, retracted position completely concealed within the spoke and rim, shown in FIG. 2, and an operative, fully extended position, shown in FIGS. 1 and 3, in which the obstructing end portion of the bar protrudes radially beyond, the rim 4 by a distance sufficient to prevent effective rotation of the wheel in an automobile by fouling the windshield or other body part such as a door. A key operated lock 21 is mounted on the spoke 3 to move a latching member 22 thereof radially of the security bar into engagement in a selected locking recess 13 or 16 to lock the security bar in the retracted or fully extended positions, respectively, as best seen in FIG. 5.

Figure 4:
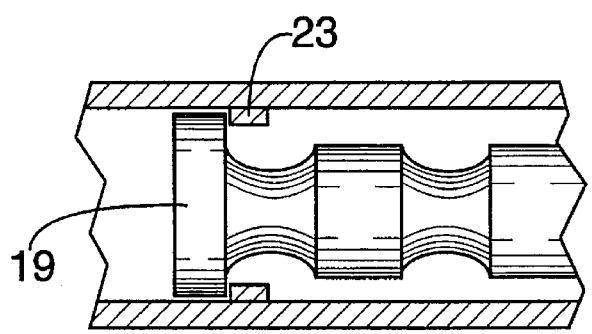
FIG. 4 is an enlarged diagrammatic fragmentary view, partly cut away of an overstop provided on the spoke with the security bar in an extended position.

As seen in FIG. 4, an inwardly protruding peripheral flange or circlip 23 is provided on an interior wall of the tubular spoke 3 for engagement with the stop flange 19 to prevent the security bar being pulled completely out of the tubular spoke, particularly during extension thereof by the driver.

Figure 7:
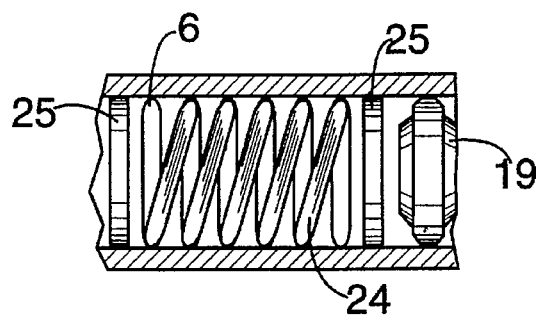
FIG. 7 is a diagrammatic fragmentary view, partly cut away, of the security bar biasing spring mechanism.

As shown in detail in FIG. 7, an helical compression spring 24 is located between washers 25 in the blind socket 6, in engagement with an anchoring end of a fully retracted security bar biasing the obstructing end portion of the security bar beyond the rim by a predetermined amount less than the obstructive distance, for example, only one inch, so as to permit the obstructing end portion to be grasped by the driver and then simply pulled out to the obstructive distance.

Thus, the security bar can simply be released by operation of the locking mechanism and simply pulled out and pushed in manually to radially extended and retracted positions, respectively, by the driver when parking or immediately prior to driving without need to change position, without any assembly or disassembly steps being required and without causing obstructive inconvenience when not in use.

The complete concealment of the security bar entirely within the tubular spoke can provide an extremely strong structure with limited or no access for the destructive tools of a thief.

As the length of the security bar is substantially greater than a radius of the wheel particularly effective obstruction is assured.

Figure 8:
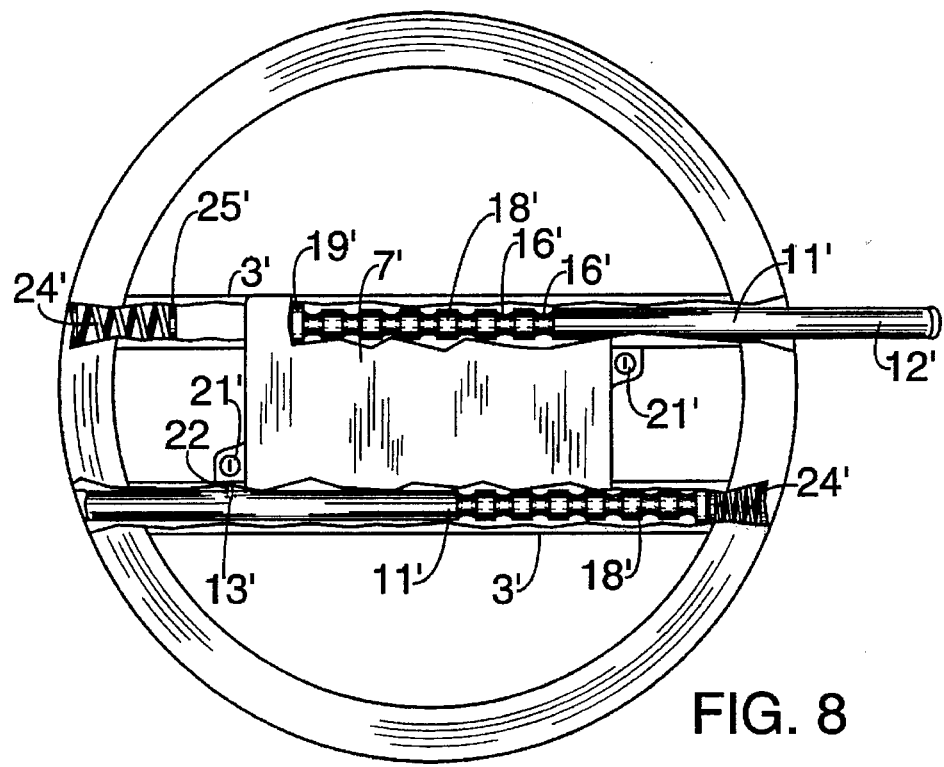
FIG. 8 is a diagrammatic plan view, partly in cross section, of a second embodiment, with two security bars in extended and retracted positions, respectively.

In the second embodiment shown in FIG. 8, elements similar to the first embodiment are shown with primed reference numerals.

In this embodiment, a large central area of the steering wheel is obstructed by a housing assembly 7' for a horn mechanism (or an air bag) and two identical security bars 11' are accommodated by respective eccentric tubular spokes 3' which extend chordal fashion on respective opposite sides of the housing. Separate locking and biasing mechanisms 21' and 24' are associated with respective security bars. As shown, the security arms are extensible in opposite radial directions from each other to provide increased obstruction.

Figure 9:
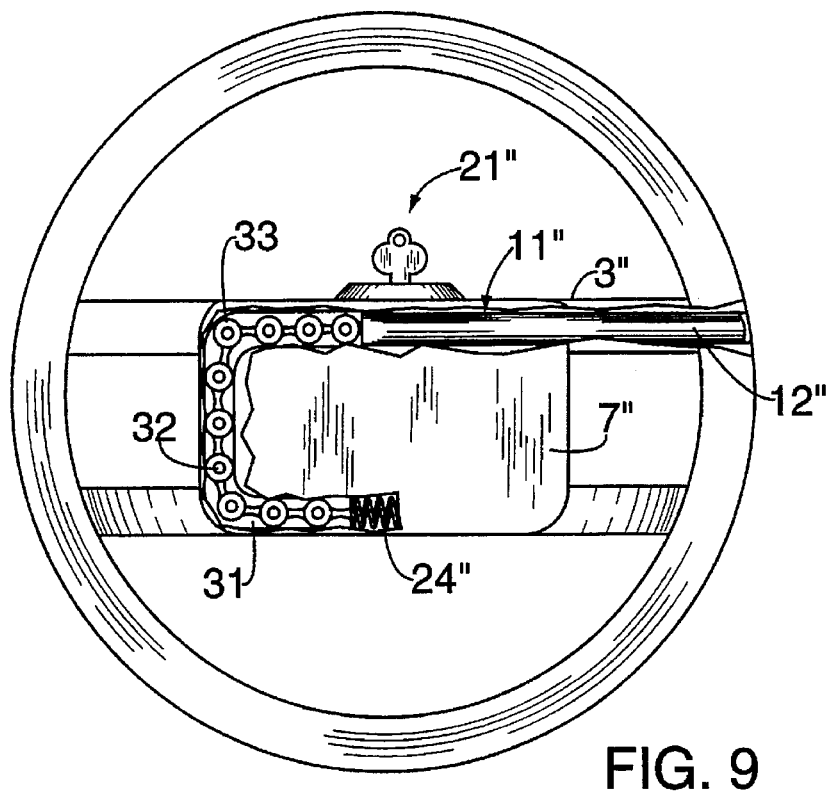
FIG. 9 is a diagrammatic plan view of a third embodiment partly in cross section with the security bar in a retracted position.
Figure 10:
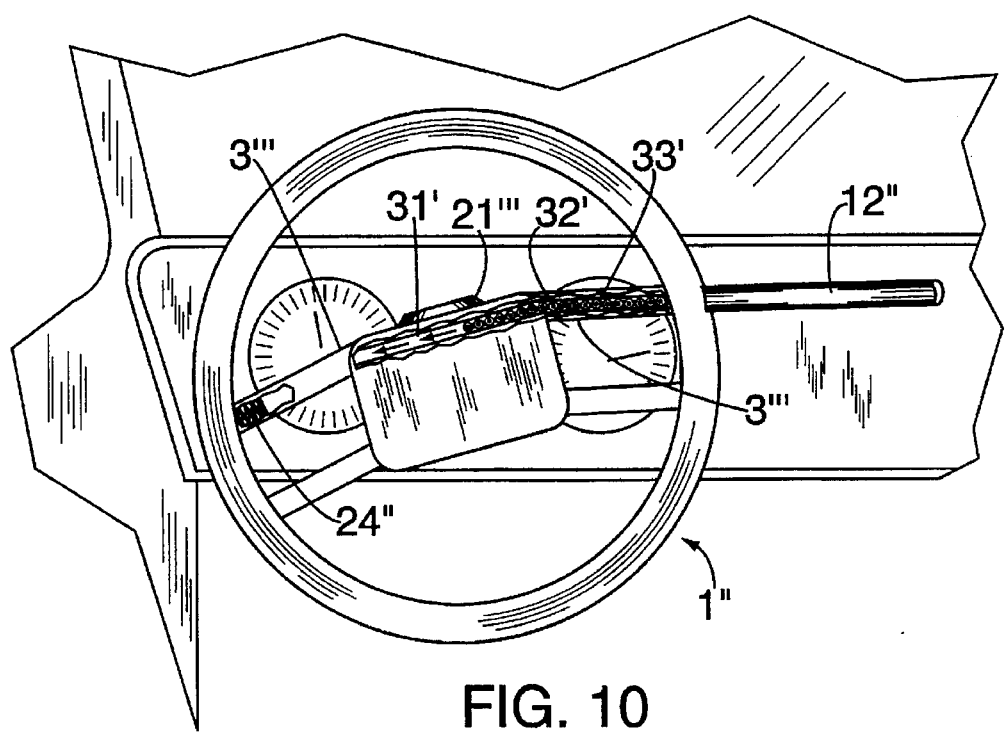
FIG. 10 is a diagrammatic perspective view, of a fourth embodiment of the invention installed in an automobile with the security bar in an extended position.

In alternative arrangements, shown in FIGS. 9 and 10, the steering wheel 1' has a central housing 7' for an air bag, a passageway 31 extends from a radially inner end of the spoke 3" or 3"' and is curved partly around a radially outer periphery of the central housing forming a blind ended socket. An elongate chain link anchoring member 32 or 32' is secured to an inner end of a security bar 3" or 3"' and received as a sliding fit in the socket so as to be confined to move laterally only in conformity with a curvature of the socket and, a resiliently compressible biassing spring 24" is mounted in the socket between a blind end thereof and a free end of the anchoring member 32 to bias the obstructing end portion 12" of the security bar 1" toward an extended position.

The chain link is similar to that used in a chain wrench of four link width with links of ¼ inch steel plate and an interlink pitch of ¾ inch. thereby providing an extremely simple and strong locking structure in combination with a latch member on the steering wheel engageable between selected links 33 or 33' of the anchoring member, in a similar fashion to that shown in FIG. 5 to retain the security arms 3 in either position.

The chain link construction enables obstructions to be avoided while retaining a long effective length and the pop-out characteristic as the laterally confined chain acts as a strut transmitting the biassing force of the compression spring.

In the fourth embodiment shown in FIG. 10, the passageway extends to another spoke of the wheel.

While the key operation has advantages of simplicity and a direct latching action a combination lock of known type can be utilized possibly moving the latching member by a solenoid mechanism.

I claim:

1. A combination steering wheel and anti-theft apparatus comprising:

a steering wheel having a tubular spoke with an opening at a radially outer end and a wheel rim formed with a through hole aligned with the opening;

an elongate, rigid security bar telescopically mounted in the spoke for movement therealong between a retracted position within the rim, and an operative, fully extended position in which an obstructing outer end portion of the security bar protrudes radially beyond the rim by an obstructive distance sufficient to prevent effective rotation of the wheel in an automobile, respectively;

and, locking means on the wheel and security bar engageable to retain the security bar in the retracted and fully extended positions, alternatively, wherein the wheel has a central housing for an air bag and a passageway extends from a radially inner end of the spoke and is curved partly around a radially outer periphery of the central housing, forming a blind ended socket; an elongate chain link anchoring member is secured to an inner end of the security bar and received as a sliding fit in the socket so as to be confined by a wall thereof to move laterally only in conformity with a curvature of the socket and, a resiliently compressible biassing spring is mounted in the socket between a blind end thereof and a free end of the anchoring member to bias the obstructing end portion of the security bar toward an extended position.

2. Apparatus according to claim 1 wherein the locking means comprises a latch member engageable between selected links of the anchoring member in a locking position.

3. A combination steering wheel and anti-theft apparatus comprising:

a steering wheel having a tubular spoke with an opening at a radially outer end and a wheel rim formed with a through hole aligned with the opening;

an elongate, rigid security bar telescopically mounted in the spoke for movement therealong between a retracted position within the rim, and an operative, fully extended position in which an obstructing outer end portion of the security bar protrudes radially beyond the rim by an obstructive distance sufficient to prevent effective rotation of the wheel in an automobile, respectively;

and, locking means on the wheel and security bar engageable to retain the security bar in the retracted and fully extended positions, alternatively, wherein the wheel has a central housing for an air bag and a passageway extends from a radially inner end of the spoke and is curved partly around a radially outer periphery of the central housing, forming a blind ended socket; an elongate chain link anchoring member is secured to an inner end of the security bar and received as a sliding fit in the socket so as to be confined by a wall thereof to move laterally only in conformity with a curvature of the socket and, a resilient biassing spring is mounted in the socket in operative engagement with one of the security bar and the anchoring member to bias the obstructing end portion of the security bar toward an extended position.

* * * * *